United States Patent
Mezhirov et al.

(10) Patent No.: US 7,537,718 B2
(45) Date of Patent: May 26, 2009

(54) HYDROPHILIC POLYETHERSULFONE MEMBRANE AND METHOD FOR PREPARING SAME

(75) Inventors: Michael Mezhirov, Bridgeport, CT (US); Eshan B. Yeh, West Hartford, CT (US); Richard Sale, Tolland, CT (US)

(73) Assignee: 3M Innovative Properties Company, Saint Paul, MN (US)

( * ) Notice: Subject to any disclaimer, the term of this patent is extended or adjusted under 35 U.S.C. 154(b) by 413 days.

(21) Appl. No.: 11/250,134

(22) Filed: Oct. 13, 2005

(65) Prior Publication Data

US 2006/0076288 A1    Apr. 13, 2006

Related U.S. Application Data

(60) Provisional application No. 60/618,522, filed on Oct. 13, 2004.

(51) Int. Cl.
*B01D 39/00* (2006.01)
*B01D 67/00* (2006.01)

(52) U.S. Cl. ............... 264/48; 264/49; 210/500.41; 210/490

(58) Field of Classification Search ............ 210/500.27, 210/500.41, 500.38, 640, 500.37, 490, 650–654; 525/327.4; 264/48–49
See application file for complete search history.

(56) References Cited

U.S. PATENT DOCUMENTS

| | | | |
|---|---|---|---|
| 4,618,533 A | 10/1986 | Steuck | |
| 4,943,373 A | 7/1990 | Onishi et al. | |
| 4,943,374 A | 7/1990 | Heininger et al. | |
| 4,964,990 A | 10/1990 | Kraus et al. | |
| 5,178,765 A | 1/1993 | Hu et al. | |
| 5,225,495 A * | 7/1993 | Han et al. | 525/327.4 |

(Continued)

FOREIGN PATENT DOCUMENTS

JP    58-137487 A    8/1983

(Continued)

OTHER PUBLICATIONS

Kenneth M. Riedl, "Microfiltration of Apple Juice: Membrane Structure and Foulant Morphology Effects on Flux Resistance," Dissertation, University of Guelph, CA, 1996.

(Continued)

*Primary Examiner*—Ana M Fortuna
(74) *Attorney, Agent, or Firm*—Daniel R. Pastirik

(57) ABSTRACT

The present disclosure relates to improved efficient and effective systems and methods of manufacturing hydrophilic polyethersulfone (PES) membrane suitable for commercial applications and the resultant hydrophilic polyethersulfone (PES) membrane suitable for commercial applications produced thereby and includes methods of manufacturing hydrophilic polyethersulfone (PES) membrane comprising the acts of: providing hydrophobic PES membrane; prewetting the hydrophobic PES membrane in a sufficient amount of a liquid having a sufficiently low surface tension; exposing the wet hydrophobic PES membrane to a sufficient amount of an aqueous solution of oxidizer; and after the exposing act, heating the hydrophobic PES membrane for a sufficient time at a sufficient temperature and methods of manufacturing hydrophilic polyethersulfone (PES) membrane comprising the acts of: providing gel PES membrane; exposing the gel PES membrane to a sufficient amount of an aqueous solution of oxidizer; and after the exposing act, heating the hydrophobic PES membrane for a sufficient time at a sufficient temperature and the resulting products.

14 Claims, 3 Drawing Sheets

U.S. PATENT DOCUMENTS

| | | | |
|---|---|---|---|
| 5,254,143 A | 10/1993 | Anazawa et al. | |
| 5,273,657 A * | 12/1993 | Nakashima et al. | 210/640 |
| 5,409,524 A | 4/1995 | Jensvold et al. | |
| 5,431,817 A * | 7/1995 | Braatz et al. | 210/490 |
| 5,543,465 A | 8/1996 | Bell et al. | |
| 6,039,872 A | 3/2000 | Wu et al. | |
| 6,071,406 A | 6/2000 | Tsou | |
| 6,193,077 B1 | 2/2001 | Witham et al. | |
| 6,495,043 B1 | 12/2002 | Heijnen | |
| 6,495,050 B1 | 12/2002 | Nomura et al. | |
| 6,890,436 B2 * | 5/2005 | Komatsu et al. | 210/500.41 |
| 7,081,202 B2 * | 7/2006 | Ohara et al. | 210/500.38 |
| 7,223,341 B2 * | 5/2007 | Wu et al. | 210/500.37 |

FOREIGN PATENT DOCUMENTS

| | | |
|---|---|---|
| WO | WO 92/22376 | 12/1992 |
| WO | WO 02/04083 | 1/2002 |

OTHER PUBLICATIONS

Hua Chen et al., "Surface Modification of Poly(ether sulfone) Ultrafiltration Membranes by Low-Temperature Plasma-Induced Graft Polymerization," Journal of Applied Polymer Science, 1999, pp. 1699-1711, vol. 72, John Wiley & Sons, Inc., US.

Dattatray S. Wavhal et al., "Modification of Porous Poly(ether sulfone) Membranes by Low-Temperature $CO_2$-Plasma Treatment," Journal of Polymer Science: Part B Polymer Physics, 2002, pp. 2473-2488, vol. 40, Wiley Periodicals, Inc. US.

* cited by examiner

HYDROPHILIC POLYETHERSULFONE MEMBRANE AND METHOD FOR PREPARING SAME

RELATED APPLICATIONS

This application is a continuation-in-part of U.S. Provisional Application No. 60/618,522, of Mezhirov et al., filed on Oct. 13, 2004, the disclosure of which is herein incorporated by reference to the extent not inconsistent with the present disclosure.

BACKGROUND OF THE DISCLOSURE

The present disclosure relates to an improved efficient and effective method of manufacturing hydrophilic polyethersulfone (PES) membrane suitable for commercial applications and the resultant hydrophilic polyethersulfone (PES) membrane suitable for commercial applications produced thereby.

As is known, PES membranes are naturally hydrophobic. Most membrane applications require the use of hydrophilic membranes. Several different methods are known to transform hydrophobic PES membranes into hydrophilic PES membranes (to perform membrane hydrophilization). Some of these methods are complicated and expensive, while others fail to provide high purity membrane (for example, the membranes could contain the remains of hazardous monomers, used for hydrophilic coating).

Several different prior known methods of PES membrane hydrophilization are presented in the patent and scientific literature. In one known prior method, the hydrophilization of PES membrane was accomplished by coating the hydrophobic membrane with a hydrophilic polymer. In order to provide the desirable permanent attachment of the hydrophilic polymer to the membrane, a hydrophilic coating layer was usually subjected to a cross-linking reaction or a coating polymer was grafted to the surface of the hydrophobic PES membrane. The preceding approach has been disclosed in the following patents and publications:

U.S. Pat. No. 4,618,533 disclosed a method of PES membrane hydrophilization by direct membrane coating. As described, the hydrophobic membrane was prewetted with alcohol, and then soaked in aqueous solution that contained a hydrophilic monomer, a polyfunctional monomer (cross-linker) and an initiator of polymerization. The monomer and cross-linker were then polymerized using thermal or UV initiated polymerization, which formed a coating of cross-linked hydrophilic polymer on the membrane surface.

U.S. Pat. Nos. 6,193,077 B1 and 6,495,050 B2 proposed coating the PES membrane by soaking the membrane in an aqueous solution of hydrophilic polymer (polyalkylene oxide) and at least one polyfunctional monomer (cross-linker), then polymerizing a monomer. As described, a non-extractable hydrophilic coating was the resultant.

The article "Surface modification of Poly(ether sulfone) Ultrafiltraton Membranes by Low-Temperature Plasma-Induced Graft Polymerization (Journal of Applied Polymer Science, Vol. 72, 1699-1711 (1999)) describes the hydrophilization of PES membrane by a grafting reaction. In this process as described therein, hydrophilic PES membrane was submitted to low-temperature helium plasma treatment followed by the grafting of hydrophilic monomer N vinyl-2-pyrrolidone onto the membrane surface.

In another known prior method, the hydrophilization of PES membrane was accomplished by dissolving hydrophobic PES polymer in a solvent and blending it with a hydrophilic additive, which was soluble in the same solvent. The obtained blended solution was used for casting a hydrophilic membrane.

The following patents disclose representative prior methods of PES membrane hydrophilization by blending PES polymer with hydrophilic additives.

U.S. Pat. No. 4,943,374 proposed to blend PES in a solution with hydrophilic polymers (polyethylene glycol, PVA, polyacrylic acid, polyvinilpirrolidone, etc.). According to the patent, the resultant membranes obtained from the blended solutions were hydrophilic.

U.S. Pat. No. 6,071,406 disclosed the production of hydrophilic PES membranes by blending PES in a solution with a wetting agent (a block copolymer having hydrophilic and hydrophobic units). In the resultant membrane, the hydrophobic units of the block copolymer were permanently attached to the hydrophobic matrix (PES) leaving the hydrophilic units on the membrane surface. Since, according to this patent, the wetting agent was permanently attached to the membrane and could not be leached, the resultant membrane possessed permanent hydrophilicity.

U.S. Pat. No. 5,178,765 disclosed the hydrophilization of PES membrane by blending PES with hydrophilic poly-2-oxazoline resin and polyvinylpyrrolidone resin. According to this patent, the membrane obtained thereby exhibited long-term water wettability.

U.S. Pat. No. 6,495,043 B1 disclosed a method for PES membrane hydrophilization by blending PES with hydrophilic ethylene oxide/propylene oxide copolymer. According to this patent, the resultant hydrophilic membrane had a reduced tendency toward fouling. As is known to those skilled in the art, the term "fouling" means clogging the membrane pores during the filtration process.

U.S. Pat. No. 6,039,872 disclosed a method of producing hydrophilic PES membrane by blending the PES with a hydrophilic monomer and an initiator for thermal polymerization. After blending, the polymer solution was heated to a temperature sufficient to start a polymerization of the blended monomer. The resultant polymer solution reportedly contained a blend of PES with hydrophilic polymer. The membrane produced from this resultant solution was reportedly hydrophilic.

U.S. Pat. No. 4,964,990 disclosed a method, which included a combination of blending PES in a solution with a hydrophilic additive, followed by a hydrophilic coating of the membrane. In the method described in this patent, the PES was mixed in a solution with a hydrophilic polymer (polyethylene glycol or polyvinylpyrrolidone), and then the membrane was cast, quenched and dried. The dried membrane was post treated with an aqueous solution of polyvinyl alcohol and then cross-linked. The patent claimed that the resultant membrane possessed permanent wettability and stability after exposure to prolonged treatment in isopropanol or extended heat treatment.

In yet another known prior method, the hydrophilization of PES membrane was accomplished by treatment with low temperature plasmas. The following publications describe the application of plasma reactions for PES membrane hydrophilization:

The dissertation "Surface modification of porous polymeric materials using low-temperature plasmas" (Michelle L. Steen, Colorado State University, 1994) described a surface modification of several membranes from different polymers, including PES. To impart permanent hydrophilic properties to these membranes, the membranes were treated with low-temperature plasma. It was reported that the plasma treatment initiated formation of hydroxyl radicals (OH radicals). OH radicals were the primary reactive species involved in membrane modification. Because of the influence of OH radicals, the oxidation reaction occurred, and hydrophilic groups containing oxygen appeared on the membrane surface. It was reported that the presence of these polar groups made the membrane hydrophilic.

The article "Modification of porous Poly(ether sulfone) Membranes by Low-Temperature $CO_2$ Plasma Treatment" (Journal of Polymer Physics, Vol. 40, 2473-2488 (2002)) described the hydrophilic modification of PES membrane by treatment with low temperature $CO_2$-plasma. The article claims the formation of hydrophilic functionalities on the membrane primarily during a plasma treatment, with some incorporation of atmospheric oxygen and nitrogen on the membrane surface immediately upon exposure the membrane to air.

Shortcomings of the above described prior methods are presented below.

The Coating Methods of PES Membrane Hydrophilization

One shortcoming of the above described membrane coating processes is their degree of complexity. One representative typical scheme for membrane coating is illustrated in FIG. 1. As shown, the hydrophobic PES membrane 10 is prewetted in an alcohol solution 12, then washed with water 13, and soaked 14 in aqueous solution containing a hydrophilic monomer, cross-linker (polyfunctional monomer) and the initiator of polymerization. Then, the thus treated membrane is sandwiched between films 16 (usually Mylar films) and proceeds to the polymerization area 15. As is known, the polymerization process can be initiated by heat, UV radiation or γ-radiation. In case of thermal polymerization, the membrane typically traverses along the surface of a hot plate 15, and the polymerization reaction is initiated at the temperature of about 80° C. to about 90° C. In cases where the reaction is initiated by UV radiation or γ-radiation, the sources of UV or γ-radiation are installed instead of a hot plate 15, as would be appreciated by those skilled in the art. After polymerization, the membrane is washed with water at 17 and dried by conventional means at 18.

The above representative scheme shows that the coating process requires significant amounts of the equipment and consumes a considerable amount of Mylar film. At the same time, the monomers and the cross-linkers applied in the representative coating polymerization process are regarded to be hazardous substances. The possibility that small amounts of these substances remain in the membrane could be a concern for the membrane applications in the fields, which require highly pure end products. Thus, it is clear that there is a need to significantly reduce the complexity and the cost of the membrane hydrophilization process, as well as the possibility of hazardous substances remaining in the end membrane product.

Blending PES with Hydrophilic Additives Methods of PES Membrane Hydrophilization The main disadvantage of this approach is that in order to achieve the desired hydrophilization effect, the amount of applied hydrophilic additive is usually very significant.

The following patents illustrate the amounts of hydrophilic additives required to effectively practice this method. Specifically, U.S. Pat. No. 5,178,765 shows that the amount of hydrophilic polymer poly-2-oxazoline resin blended with PES in solution is from 24 to 47% of the PES weight. U.S. Pat. No. 6,071,406 shows that the amount of hydrophilic block-copolymer, blended with PES, is from 250 to 350% of the PES weight. U.S. Pat. No. 6,495,043 B1 shows that the amount of hydrophilic additive (ethylene oxide/propylene oxide copolymer) is 80% of the PES weight. The presence of large amounts of the additive in the membrane (and, correspondingly, reduced amount of PES) can reduce the valuable properties of PES membranes (such as a high stability in acidic and basic media, mechanical strength, thermal stability etc.)

Treatment of PES Membrane with Low-Temperature Plasma

The study of the treatment of PES membranes with low temperature plasma was performed, primarily, using small laboratory reactors, as would be understood by those skilled in the art. In the scale-up of the laboratory process, the plasma treatment of the membranes may cause some problems: the process uniformity and membrane quality produced by large reactors have not always proven to be sufficient; sometimes plasma can damage the membrane due to the etching from ion bombardment. In many cases, such plasma treatment processes require a reduced pressure environment. These process control problems are especially important when membrane manufacturing is performed as a continuous process.

Generally, although the continuous hydrophilization of PES membranes by treatment with low-temperature plasma looks promising, currently the technology and the equipment for this process are in the research and development stage. Additional study will be required to reach a more definite conclusion about the practical application of the low temperature plasma approach in PES membrane manufacturing.

Additional Membrane Oxidation Prior Art

U.S. Pat. No. 4,943,373 describes and claims a hydrophilic membrane formed from polyvinylidene fluoride (PVDF) wherein hydrophilic properties were imparted to the membrane by oxidation through the chemical treatment. Oxidation was performed through the treatment of PVDF membrane with a strong alkali solution (10 to 60% NaOH) containing an oxidizing agent (potassium permanganate). According to the process description, under the action of strong alkali, conjugated double bonds are formed on the polyvinylidene fluoride as the consequence of the removal of hydrofluoric acid from the PVDF molecule, such formed double bounds are instantaneously oxidized producing hydrophilic polar groups. The double bond formation under the action of strong alkali is specific for PVDF molecules. This patent describes and claims only hydrophilic oxidized membrane that can be reacted in alkali condition to form conjugated double bonds, such as PVDF. It does not include the oxidation of any membrane that cannot form conjugated double bonds in alkali condition, such as PES membrane.

Several patents and publications describe the modification of PES membranes by oxidation but for purposes other than hydrophilization. The goals of the oxidation treatments described therein did not relate to membrane hydrophilization, and no information about change of the membrane's hydrophilic properties was presented therein.

U.S. Pat. No. 5,409,524 discloses a method for treatment of gas separation membranes made from different polymers (including PES). The treatment included: a) heating the membrane at 60 to 300° C., b) Irradiating the membrane with a UV radiation source in the presence of oxygen for a time sufficient to surface oxidize the membrane. The treated membranes exhibited enhanced selectivity in gas separation and no information about changes of the membrane's hydrophilic properties was presented therein.

Japanese Patent No. 137,487/83 discloses a process of regeneration of spent membranes from different polymers (including PES) with the aqueous solution containing a surfactant and an oxidizing agent (hypochlorite ion or hydrogen peroxide) in order to speed up the membrane regeneration process. The degree of a regeneration of spent membranes in the presence of an oxidizer was more complete (93.3%) than in the case when no oxidizer was used (66.7%); however, no information about changes of the membrane's hydrophilic properties was presented therein.

The dissertation "Microfiltration of Apple Juice: Membrane Structure and Foulant Morphology Effects on Flux Resistance" ((Kenneth M. Riedl, University of Guelph (Canada), 1996)) describes the study of membrane fouling during the process of apple juice filtration. Several membranes from different polymers (including PES membrane) were studied. It was shown, according to the dissertation, that resistance of a fouling layer, formed on the membrane during a juice filtration, could be reduced by a treatment of the membrane with the oxidizing agent and no information about changes of the membrane's hydrophilic properties was presented therein.

Thus, there remains a need to develop a relatively simple, cost effective and reliable method for the preparation of hydrophilic PES membrane.

SUMMARY OF THE DISCLOSURE

One aspect of the present disclosure includes an improved method of manufacturing hydrophilic polyethersulfone (PES) membrane of the present disclosure comprising the acts of providing hydrophobic PES membrane; prewetting the hydrophobic PES membrane in a sufficient amount of a liquid having a sufficiently low surface tension; exposing the wet PES membrane to a sufficient amount of aqueous solution of oxidizer; and after the exposing act, heating the hydrophobic PES membrane for a sufficient time at a sufficient temperature.

Another aspect of the present disclosure includes a method of manufacturing hydrophilic polyethersulfone (PES) membrane comprising the acts of: providing hydrophobic PES membrane; prewetting the membrane in alcohol; washing the membrane with DI water; immersing the washed membrane in an aqueous solution of about 2 to about 9% ammonium persulfate; heating the solution with the immersed membrane from ambient temperature to about 80 to about 95° C. and then maintaining the resultant membrane at about 80° C. to about 95° C. for about 15 minutes; washing the membrane in water and then drying the resultant membrane.

Yet another aspect of the present disclosure includes a method of manufacturing hydrophilic polyethersulfone (PES) membrane comprising the acts of: providing hydrophobic PES membrane; prewetting the hydrophobic PES membrane in IPA; washing the resultant membrane with DI water; and immersing the resultant membrane in about a 12% aqueous solution of sodium hypochlorite for about 3 minutes at about 90° C. to about 95° C.

Still another aspect of the present disclosure includes a method of manufacturing hydrophilic PES membrane comprising the acts of: providing hydrophobic PES membrane; prewetting the hydrophobic PES membrane with about a 50% aqueous solution of methanol; washing the resultant membrane with DI water; immersing the resultant membrane in about a 20% solution of hydrogen peroxide ($H_2O_2$); heating the hydrogen peroxide ($H_2O_2$) solution at about 50° C. to about 70° C. for about 30 minutes; raising the temperature of the hydrogen peroxide ($H_2O_2$) solution to about 98° C.; maintaining the temperature of the hydrogen peroxide ($H_2O_2$) solution at about 98° C. temperatures for about 40 minutes.

Another aspect of the present disclosure includes removing the membrane from the hydrogen peroxide ($H_2O_2$) solution; washing the resultant membrane with DI water for about 10 minutes at a temperature of about 40° C.; and drying the resultant membrane at about 60° C. for about 40 minutes.

Yet another aspect of the present disclosure includes during the immersing act, using an aqueous solution containing about 71% DI water, about 15% hydrogen peroxide and about 4% APS.

Still another aspect of the present disclosure includes heating the membrane in the above aqueous solution at a temperature of about 50° C. to about 70° C. for about 30 minutes; uniformly raising the temperature of the aqueous solution to about 92° C. for about 20 minutes; and thereafter, maintaining the temperature of the aqueous solution at about 92° C. for about 20 minutes.

Another aspect of the present disclosure includes removing the resultant membrane from the above aqueous solution; washing the resultant membrane with DI water for about 15 minutes at a temperature of about 40° C.; and drying the resultant membrane at about 65° C. for about 35 minutes.

Another aspect of the present disclosure includes the use of gel membrane which has gone through phase inversion and washing but has not been dried. Such "gel" membrane will be treated in a similar way as described in this section Another aspect of the present disclosure includes a method of manufacturing hydrophilic polyethersulfone (PES) membrane comprising the acts of: providing gel PES membrane; exposing the gel PES membrane to a sufficient amount of an aqueous solution of oxidizer; and after the exposing act, heating the hydrophobic PES membrane for a sufficient time at a sufficient temperature.

Still another aspect of the present disclosure includes after the exposing act in the solution of oxidizer, operatively positioning the membrane between two films so that the membrane is sandwiched therebetween; and continuously moving the sandwiched membrane through at lest one heating zone.

Yet another aspect of the present disclosure includes during the heating act, operatively positioning the membrane in a saturated water steam medium; and continuously moving the membrane through the saturated water steam medium.

Other objects and advantages of the disclosure will be apparent from the following description, the accompanying drawings and the appended claims.

DETAILED DESCRIPTION OF REPRESENTATIVE EMBODIMENTS

Figure 1:
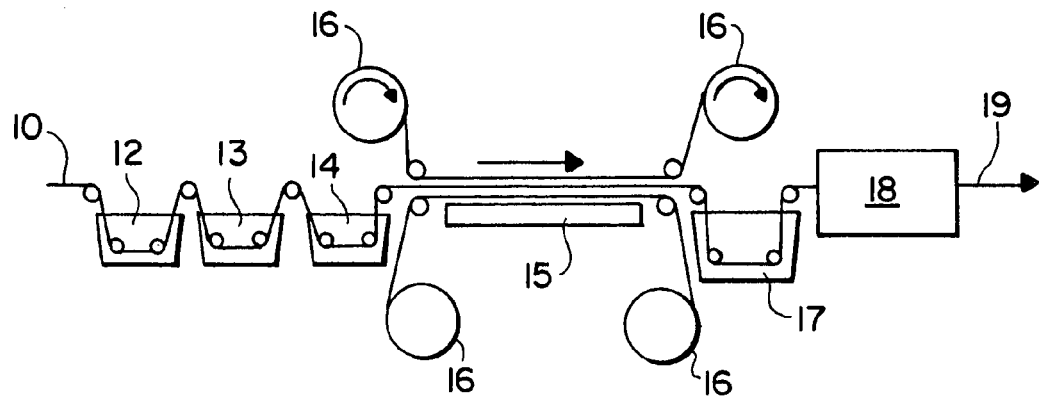
FIG. 1 is a schematic representation of a typical representative prior art system for PES membrane coating to produce a hydrophilic PES membrane.

The present disclosure is directed to a new effective and economical method for the hydrophilization of PES membrane, which can successfully compete with all previously known methods and, quite possibly, exceed them.

We found that PES membrane hydrophilization was effectively and economically performed by utilizing a chemical oxidation process without utilization of complicated equipment, such as, for example, plasma treatment reactors and we believe this chemical oxidation process can be successfully applied in industrial conditions for commercial membrane manufacturing including continuous manufacturing processes.

The following examples describe the hydrophilization of PES membrane using oxidation with ammonium persulfate, and other representative oxidation agents according to the present disclosure.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

We performed the PES membrane oxidation to achieve PES membrane hydrophilization by treating the hydrophobic PES membrane in an aqueous solution of an oxidizer.

One representative oxidizer, Ammonium persulfate $(NH_4)_2 S_2O_8$, was chosen as the oxidizer for initial use in this process.

Ammonium persulfate (APS) is known to be a strong water soluble oxidizer: its standard oxidation potential is 2.01 volts. According to this potential APS is placed near the top of the oxidizers list.

In the following table, the standard oxidation potentials for the several popular oxidizers are presented:

| Oxidizer | E°/V |
|---|---|
| APS | 2.01 |
| Hydrogen peroxide ($H_2O_2$) | 1.78 |
| Bleach (HClO) | 1.61 |
| Permanganate ($MnO_4^-$) | 1.5 |
| Ozone ($O_3$) | 1.24 |
| Dichromate ($Cr_2O_8^{-2}$) | 1.23 |

(The data are taken from the Handbook of Chemistry and Physics, CRC Press, 2003, page 8-28)

It is presently believed that, in an acid environment of pH<7.0, the increase concentration of hydrogen ions ($H^+$) may react with the oxidizing agent to generate a greater oxidation potential than in a neutral or base environment.

EXAMPLE 1

Example 1 illustrates the batch method of one process of the present disclosure.

The first step involves the: preparation of hydrophobic PES membrane. First, the membrane was cast on the glass plate using the dope of following formulation:

| | |
|---|---|
| PES polymer (Radel polymer from Solvay) | 14%; |
| 1-Methyl-2-pyrrolidone (solvent) | 21%; |
| Polyethylene glycol 400 (poroformer) | 65%. |

Next, the cast membrane was air quenched inside a humidity chamber at a temperature of about 23° C. and having an air humidity from about 65 to about 68% for about 25 minutes. The thus quenched membrane was then washed with DI water for about 30 minutes and then dried at about 80° C. for about 15 minutes.

The hydrophobic PES membrane, obtained as described above, was first used in the present Example and was also used in other Examples (Examples 2-5 below).

Once the hydrophobic PES membrane was obtained, it was hydrophilized as follows:

A sample of hydrophobic PES membrane (about 10 cm×about 10 cm) was prewetted in isopropyl alcohol (IPA), washed with DI water and immersed in an aqueous solution of oxidizer (ammonium persulfate). The concentration of ammonium persulfate (APS) was about 3%. The solution was heated from ambient to about 90° C.-95° C. and maintained at about 90° C.-95° C. for about 15 minutes.

After undergoing the above described treatment, the resultant membrane was cooled to ambient temperature, washed with water for about 10 to about 20 minutes in order to remove the remains of oxidizer and then dried at about 70° C. for about 40 minutes.

The hydrophilic properties of membrane resulting from the above process are shown in the Table 1.

TABLE 1

Hydrophilic properties of membrane oxidized using a batch method.

| Membranes | Wetting time in water |
|---|---|
| Original PES membrane | Hydrophobic |
| Oxidized membrane | Instantaneously* |

TABLE 1-continued

Hydrophilic properties of membrane oxidized using a batch method.

| Membranes | Wetting time in water |
|---|---|
| Oxidized membrane after boiling in water for 1 hour | Instantaneously |
| Oxidized membrane after boiling in IPA for 1 hour | Instantaneously |

*The term "Instantaneously" means that the wetting time was less than the time that could be measured using a stop-watch (normally less than 0.5 sec.).

As evident from the above, the resultant membrane readily demonstrated hydrophilicity and retained hydrophilicity upon exposure to boiling water and IPA.

Example 2 demonstrates the membrane hydrophilization process utilizing another oxidizer—Sodium Hypochlorite.

EXAMPLE 2

A sample of hydrophobic PES membrane (about 8 cm×40 cm) was prewetted in IPA, washed with DI water and immersed in about 12% aqueous solution of sodium hypochlorite for about 3 minutes. Then the membrane was taken out of the solution and wound into a roll with diameter of about 3 cm. The rolled membrane was again immersed in 12% aqueous solution of sodium hypochlorite, and the solution temperature was raised to about 97° C. The membrane was kept in the solution at this temperature for about 1 hour. Then the membrane roll was taken out of the solution, the membrane was unwound, washed with DI water for about 30 minutes and dried at about 70° C. for about 30 min. The resultant membrane was hydrophilic: it was wetted in water instantaneously.

Figure 2:
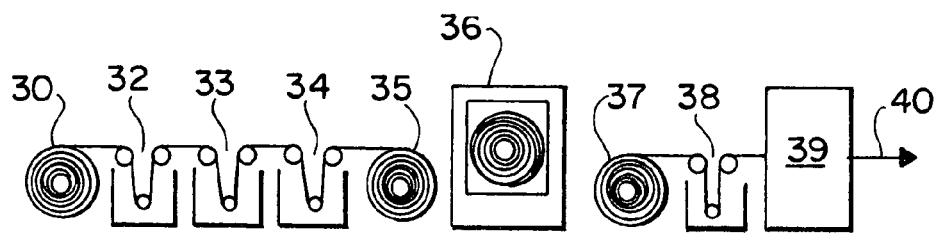
FIG. 2 is a schematic representation of a representative dry membrane batch process system for the hydrophilization process of PES membrane according to the present disclosure.

Thus, the hydrophilization process of the PES membrane, performed as shown in examples 1 and 2, in accordance with the present disclosure, is simple, and can be applied in manufacturing conditions for the batch process of membrane treatment in the rolls, as shown in FIG. 2.

As shown in FIG. 2, the hydrophobic PES membrane 30 is prewetted in alcohol solution 32, then washed in water 33, and soaked in aqueous solution of oxidizer at 34 and wound on the roll 35. The roll 35 is heated in the oven 36 (other heating methods are also possible, for example, microwave heating and other known processes) to the temperature of oxidation reaction for a sufficient time and is then the oxidized membrane 37 is processed through the washing 38 and drying 39 steps.

It is known that the continuous methods of membrane treatment are preferable for manufacturing conditions because, as a rule, the continuous methods of membrane treatment are more economical and provide better uniformity of produced membrane than batch methods.

Building on the success of the above examples 1 and 2, we further developed a continuous method of manufacturing for PES membrane hydrophilization production. In this particular representative method, a "sandwich" method of membrane treatment was used similar to that utilized in the membrane coating manufacturing process of FIG. 1.

In this presently preferred manufacturing process, the membrane continuously travels through the bath with alcohol for prewetting, then passes the water bath for washing, then passes the bath with APS solution and, after soaking in APS solution, the membrane is sandwiched between the films (preferably Mylar films). The heat treatment of the membrane is performed continuously between the Mylar films, for example by moving the "sandwich" along the surface of the hot plate, preheated to about 95-105° C. After the oxidation reaction is completed, the membrane is going out of Mylar films and then is washed and dried.

The specific process developed utilizing one possible "sandwich" method for membrane oxidation is described in the following Example, which describes the presently preferred continuous manufacturing process for PES membrane hydrophilization production.

EXAMPLE 3

A sample of hydrophobic PES membrane (about 8 cm×about 24 cm) was prewetted with IPA, washed with DI water for about 5 minutes and soaked in about 3% APS solution for about 2 minutes. Next, the sample was treated in the device, shown in the FIG. 3. The membrane sample 45, after soaking in APS solution, was sandwiched between two bars of Mylar film 46. One end of the sandwich was connected to the roller 49, which pulled the sandwich at a speed of about 30 cm/min along the surface of a hot plate 47. The hot plate had a temperature regulation +/−1° C. and was preheated to about 102° C. A piece of sponge 48 was placed on the sandwich surface to uniformly press the sandwich to the hot plate and also to prevent the membrane from cooling. The hot plate length was about 60 cm, and the speed of sandwich movement (about 30 cm/min) provided membrane heating on the hot plate for about 2 minutes. After heating, the membrane was taken out of the sandwich, washed in water for about 10 minutes, and dried at about 80° C. for about 30 minutes.

As shown in Table 2, test A, the treated membrane was instantaneously wetted in water and in NaCl solution having a concentration of about 20%. The membrane retained hydrophilicity after heating in water in an autoclave at about 124° C. for about 1 hour.

Because of the short oxidation time (about 2 minutes), the "sandwich" method can potentially be conveniently arranged as a continuous process for the large-scale manufacturing of hydrophilic PES membrane.

During our study, we surprisingly found that we could successfully hydrophilize membrane in the gel state using the oxidation process of the present disclosure. The gel membrane is a membrane precursor, which was gone through the stages of casting, quenching and washing, but has not been dried.

Oxidization of the membrane in the gel state is very interesting because the use of membrane in the gel state significantly shortened the manufacturing process of hydrophilic PES membrane suitable for commercial scale processing. The use of the membrane in the gel state approach eliminated the step of membrane drying (after the phase inversion and washing steps) as well as the steps of membrane prewetting with IPA and washing IPA off the membrane resulting in the efficient and effective method of manufacturing hydrophilic PES membrane suitable for commercial scale processing.

The oxidation of the membrane in a gel state can have an additional advantage in that utilization of the gel membrane can significantly increase the efficiency of the oxidation process.

As known by those skilled in the art, membrane in the gel state has much higher porosity than a dried membrane. During the drying process, the membrane shrinks and, because of this shrinkage, it is believed that the number and the diameter of pores in the membrane can be significantly reduced. Due to a developed system of pores, the gel membrane is therefore believed to be more penetratable for different dissolved substances than for a dried membrane.

We presently believe that since the oxidizers utilized with the present disclosure can penetrate into the structure of gel membrane much faster and deeper, significantly increased degree of oxidation and hydrophilicity can be achieved by oxidation of the membrane in a gel state as compared to the oxidation of the previously dried membrane.

The presently preferred manufacturing process for PES membrane in a "gel" state is described below in the Example 4.

EXAMPLE 4

A sample of gel or "never dried" PES membrane (about 8 cm×about 20 cm) was soaked in APS solution, and treated the same way as described in the example 2. The only difference was that because a "never dried" membrane was utilized, the step of membrane prewetting in alcohol and the step of washing off the alcohol were excluded. The hydrophilicity of the resulting membrane is shown in the Table 2, Test B.

As can be seen, the resultant membranes produced using both type of samples, previously dried membranes and the membranes in the gel form, showed high hydrophilicity. In an effort to simulate the membrane sterilization process, the resultant membranes were subjected to treatment in an autoclave at about 124° C. In the end, the hydrophilicity of all samples tested was not noticeably changed. At the same time, the process of hydrophilization of "gel" membrane is significantly shorter since it does not include the operations of drying membrane after quenching and washing and the operations of membrane prewetting and washing before oxidation.

TABLE 2

Wetting time of PES membranes after oxidation using a sandwich method.

| | | Wetting time, sec. | |
|---|---|---|---|
| Test | Membrane | In water | In 20% NaCl |
| A | Membrane, oxidized after drying | | |
| | Oxidized membrane without additional treatment | Instantaneously | Instantaneously |
| | Oxidized membrane, boiled in water for 1 hour | Instantaneously | Instantaneously |
| | Oxidized membrane heated in an autoclave at 124° C. for 45 min. | Instantaneously | Instantaneously |
| B | Membrane, oxidized in a gel state | | |
| | Oxidized membrane without additional treatment | Instantaneously | Instantaneously |
| | Oxidized membrane, boiled in water for 1 hour | Instantaneously | Instantaneously |
| | Oxidized membrane heated in an autoclave at 124° C. for 45 min. | Instantaneously | Instantaneously |

One possible economical disadvantage of utilizing the "sandwich" scheme in the production process is the significant consumption of Mylar films. However, the application of liquid impermeable films, such as Mylar, in the production process is necessary in order to prevent the PES membrane from drying out while being treated at high temperature, such as, for example, 80-95° C. Without a film cover, the membrane dries very fast on the hot plate and thus, the oxidization reaction is insufficient to produce hydrophilic membrane since APS can react with a membrane only when the APS is in the dissolved state.

In our continuing efforts to simplify and economize the hydrophilic PES membrane manufacturing process, we discovered a method of continuous membrane hydrophilization that did not require the use of the Mylar films for membrane oxidation processing and is believed simpler than a "sandwich" method. To prevent drying of uncovered membrane during the oxidation reaction, we found that heating the membrane in the medium of saturated steam was sufficient to obtain and maintain the conditions necessary for the oxidation process to be completed without film application.

It is known that the saturated water steam has the highest possible humidity at the certain temperature and cannot accept any additional amount of water. Because of this at the conditions of our experiment, the saturated steam medium reliably prevents the membrane from drying.

The relatively low temperature of the oxidation process (below 100° C.) facilitates the application of a steam treatment process without pressure. At the above conditions, the process is safe and the required equipment is relatively simple and inexpensive, as compared to some prior art processes.

The following example illustrates the hydrophilization of uncovered membrane (without Mylar films being utilized in the process):

EXAMPLE 5

A sample of hydrophobic previously dried PES membrane about 5 cm×about 8 cm (sample A) was prewetted in IPA, washed with water for about 10 minutes and soaked in about 6% APS solution for about 5 minutes. A sample of hydrophobic "never dried" PES membrane about 5 cm×about 8 cm (sample B) was soaked in about 6% APS solution (without previous prewetting and washing). Both samples were placed on a piece on metallic net (about 10 cm×about 10 cm). A 2 L beaker was filled with water to about ¼ of its volume, and water was brought to boiling. The net with membrane samples was fixed inside the beaker approximately at about 10 cm above the water level. The beaker was covered, and after about 6 minutes of exposure to the medium of saturated steam, the samples were taken out, washed with water for about 10 minutes and dried at about 70° C. Both samples (obtained from a previously dried membrane and from a "gel" membrane) demonstrated high hydrophilicity, as shown in the Table 3. As should be evident, both samples were instantaneously wetted in water and in about 20% NaCl solution At this point, a control process was undertaken which comprised the treatment of the membrane samples without the application of the steam medium. As shown in sample C in Table 3 below, the hydrophobic, previously dried, PES membrane was prewetted, washed and soaked in APS solution the same way as it is described in the Process for the sample A and sample D of gel membrane was soaked in APS solution the same way as it is described in the Process for the sample B. Both samples (C and D) were placed without being placed between films on the surface of the metallic plate preheated to about 95° C. and then were heated on this plate at about 95° C. for about 6 minutes. Then the samples were washed and dried the same way as it was described in the Process 1.

Table 3 below shows the hydrophilicity of the samples A, B, C and D obtained in Example 5 below.

TABLE 3

Hydrophilicity of the samples, heated without films in the steam medium and without the steam medium.

| Sample | Membrane | Wetting time | |
|---|---|---|---|
| | | In water | In 20% NaCL |
| | Membranes heated in a steam medium | | |
| A | Membrane oxidized after drying: | | |
| | Oxidized membrane without additional treatment | Instantaneously | Instantaneously |
| | Oxidized membrane boiled in water for 1 hour | Instantaneously | Instantaneously |
| B | Membrane oxidized in a gel state: | | |
| | Oxidized membrane without additional treatment | Instantaneously | Instantaneously |
| | Oxidized membrane boiled in water for 1 hour | Instantaneously | Instantaneously |
| | Membranes heated without steam medium | | |
| C | Membrane oxidized after drying: | Not wettable | Not wettable |
| D | Membrane oxidized in a gel state: | Not wettable | Not wettable |

The results presented in the table 3 show that both types of membranes (previously dried and gel membranes), after hydrophilization in a steam medium obtained high and stable hydrophilicity. At the same time, the membranes, which were treated the same way but without application of the steam medium, were hydrophobic. It is believed that such membranes failed to wet because the heating process allowed them to dry prior to completion of the oxidation reaction. These results clearly show the effectiveness of the proposed method of oxidation of uncovered membrane in the steam medium, according to the present disclosure.

Figure 4A:
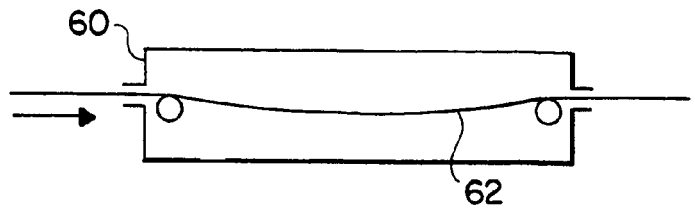
FIG. 4A is a schematic representation of a representative method of heating uncovered, unsupported membrane in a steam medium.
Figure 4B:
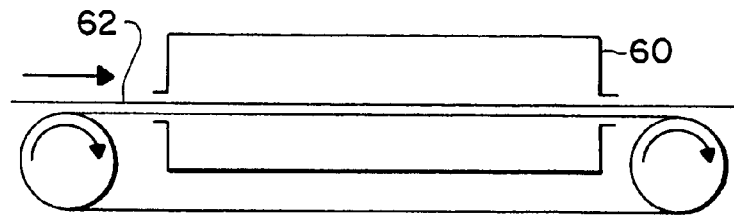
FIG. 4B is a schematic representation of a representative method of heating uncovered membrane on a transporting belt in a steam medium.
Figure 4C:
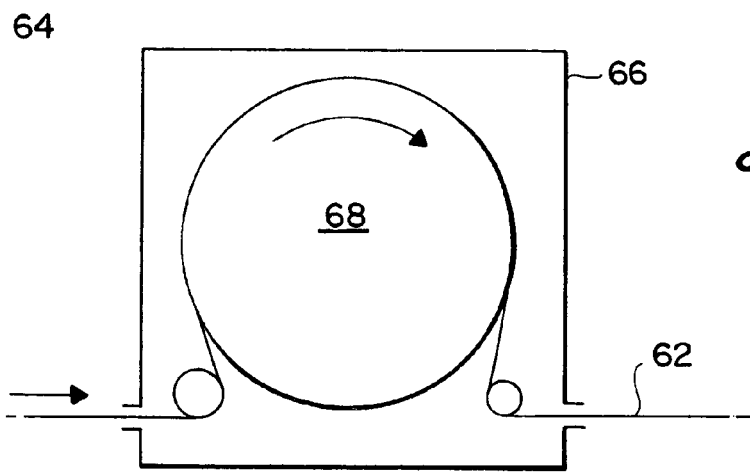
FIG. 4C is a schematic representation of a representative method of heating uncovered membrane on a rotating drum in a steam medium.

Possible representative schemes for continuous membrane transportation through the steam chamber are shown in FIGS. 4A-C. The uncovered membrane 62 can pass the steam chamber 60 without support, as illustrated in FIG. 4A, or can be supported with a transporting belt 64, as illustrated in FIG. 4B. It is presently believed that the most reliable way to transport the uncovered membrane through the steam chamber is on the surface of a hot rotating drum 68, as illustrated in FIG. 4C or on the surface of several successive drums.

Figure 5:
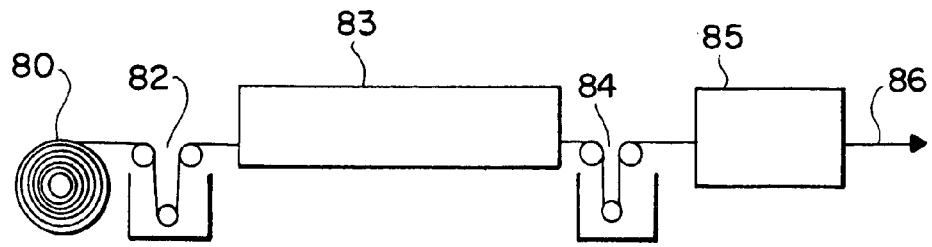
FIG. 5 is a schematic representation of a representative method of oxidizing uncovered "gel" membrane.

FIG. 5 illustrates the presently preferred manufacturing method for hydrophilization of "gel" (never dried) membrane with application of the steam medium. As illustrated in FIG. 5, this method is significantly shorter and simpler than the previous traditional process of membrane coating, as illustrated in FIG. 1.

FIG. 5 shows a roll of "gel" membrane at 80. The membrane 80 is connected to a rewind system (not shown). As the membrane 80 unwinds, it traverses through the first station 82 where the membrane soaks in aqueous solution of APS. The APS concentration in the solution can be, for example, about 3% to about 6% by Wt., the temperature about 20-30° C., soaking time about 2-4 minutes. After leaving station 82, the thus treated membrane 80 traverses a second station 83 (steam chamber) wherein the membrane is heated with saturated water steam in accordance with the diagram of FIG. 4A or FIG. 4B, or Figure C. The steam temperature can be about 90° C. to about 98° C. and the time of membrane heating in the steam chamber can be about 2 to about 4 minutes. After undergoing treatment at the second station 83, the treated membrane continues traversing to the third station at 84 (washing chamber) wherein the remains of oxidizer, which, possibly, can remain inside the membrane after the oxidation reaction is completed, are washed off with water. After completing treatment at the third station 84, the membrane continues to the fourth Station 85 (drier) wherein the membrane is dried at the temperature, for example, about 70 to about 80° C. for about 5 to about 30 minutes. After drying at the station 85, the hydrophilization process is accomplished and the hydrophilic PES membrane according to the present disclosure is obtained.

In addition to the enhanced hydrophilic properties, the membranes produced using the proposed method have low protein binding.

The protein binding test was performed using fluorescein tagged Goat IgG protein (manufactured by Cedarlane Laboratories). The aqueous solution of protein (with a protein concentration of about 10 µg/ml) was pumped with a syringe pump through a disk of tested membrane with a diameter of about 13 mm at the flow rate of about 1 ml/min. A concentration of protein in the influent and effluent was measured using a Perkin—Elmer luminescence spectrophotometer. The amount of protein adsorbed by the membrane was calculated by multiplying a volume of the protein solution, pumped through the membrane, by the difference between the protein concentrations in the influent and effluent. Several membranes were tested for comparison including the oxidized membranes obtained in the Example 1 and several commercial membranes with different protein binding.

Figure 6:
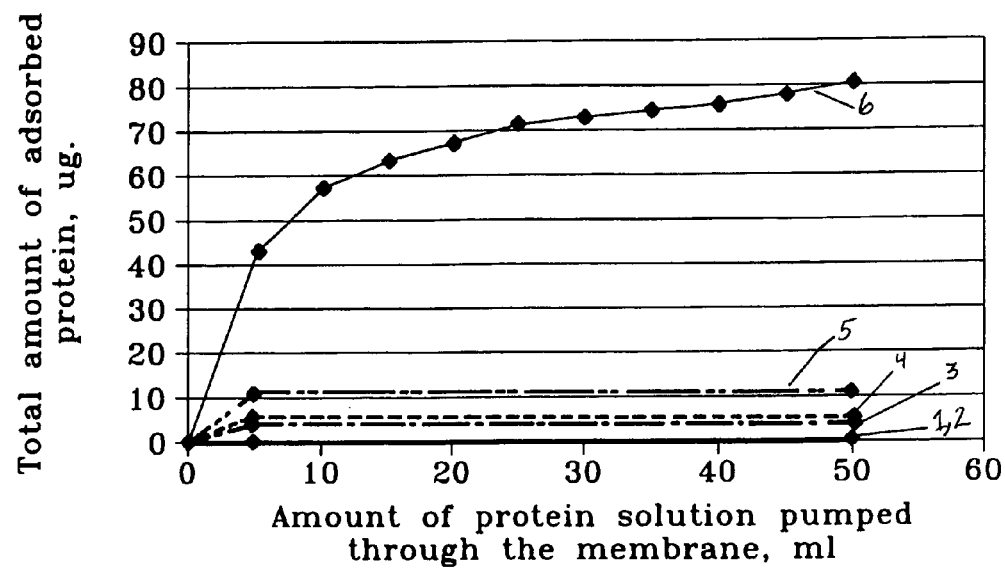
FIG. 6 illustrates protein binding results for various membranes.

FIG. 6 illustrates the protein binding results are presented in wherein the Protein binding of different membranes are prepared according to the following:

1-Millipore Durapore PVDF;
2-Membrana PES;
3-Millipore Express;
4-Sartorius Sartopore;
5-PES oxidized membrane;
6-Nylon SterASSURE.

FIG. 6 illustrates that the protein adsorption of the oxidized PES membrane was close to the protein adsorption of the commercial membranes with low protein binding (Millipore's PVDF membrane, Membrana PES; Millipore Express; Sartorius Sartopore) and was much lower than the protein adsorption of the membrane with high protein binding (nylon membrane). The obtained results show that the membrane, produced by the proposed hydrophilization method of the present disclosure, closely approximated the performance the group of those membranes known to exhibit low protein binding characteristics.

It is believed that the protein binding properties of oxidized PES can be further improved with further optimization of the above described process.

Prophetic Examples

EXAMPLE 6

A sample of hydrophobic PES membrane (about 5 cm×about 10 cm) is prewetted into about a 50% aqueous solution of methanol, washed with DI water and immersed in about a 20% solution of hydrogen peroxide ($H_2O_2$). The membrane is heated in the hydrogen peroxide ($H_2O_2$) solution at a temperature of about 50° C. to about 70° C. for about 30 minutes, then the temperature of the hydrogen peroxide ($H_2O_2$) solution is raised to about 98° C. and is maintained at about 98° C. temperature for about 40 minutes. Then, after the membrane is removed from the hydrogen peroxide ($H_2O_2$)

solution, the membrane is washed with DI water for about 10 minutes at a temperature of about 40° C. and dried at about 60° C. for about 40 minutes.

While not wanting to be bound to any theory, it is presently believed that the membrane oxidation process occurred at those conditions as follows: after the first membrane heating (at about 50° C. to about 70° C.) step, the membrane oxidation process is believed to be mostly completed and the hydrogen peroxide concentration in the solution is depleted. It is believed that the additional step of membrane heating at the elevated temperature (at about 98° C.) is performed in order to fully complete the oxidation and to decompose the remaining $H_2O_2$. Since the products of H2O2 decomposition at the high temperature are water and oxygen, the resultant membrane, should not contain any hazardous substances.

EXAMPLE 7

A sample of hydrophobic PES membrane (about 5 cm×about 10 cm) is prewetted and washed the same way as it is described in example 6 above. The sample is immersed in an aqueous solution containing the following ingredients: about 71% DI water, about 15% hydrogen peroxide (the first oxidizer) and about 4% APS (the second oxidizer). The membrane is heated in the above aqueous solution at a temperature of about 50° C. to about 70° C. for about 30 minutes. Then, the temperature of the aqueous solution is presently preferably uniformly raised to about 92° C. for about 20 minutes, after which, the temperature of the aqueous solution containing the membrane is maintained at about 92° C. for about 20 minutes. After removal from the above aqueous solution, the membrane is washed with DI water for about 15 minutes at a temperature of about 40° C. and dried at about 65° C. for about 35 minutes.

While not wanting to be bound to any theory, it is presently believed that the membrane oxidation process at those conditions appears to proceed as follows: during the first step of the process (at about 50° C. to about 70° C.) $H_2O_2$ functions as the only membrane oxidizer. APS does not appear to participate in the oxidation reaction since its working temperature is much higher (above 80° C.). After this first step of the oxidizing process is completed, the temperature is raised to about 92° C. and the second step of oxidation process is started, with APS being included in the membrane oxidation.

It is presently believed that because of the multiple oxidation processes, the oxidation degree is believed higher, and the hydrophilic properties of the oxidized membrane (including protein binding properties) are believed improved.

EXAMPLE 8

Figure 3:
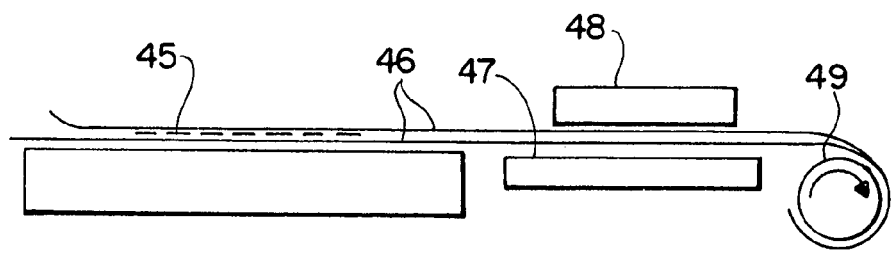
FIG. 3 is a schematic representation of a laboratory system for membrane oxidation using a sandwich method.

A sample of hydrophobic PES membrane (about 8 cm×about 24 cm) is prewetted with IPA, washed with DI water for about 5 minutes, and soaked in about a 20% solution of hydrogen peroxide. Then the sample is sandwiched between two bars of Mylar film. The obtained sandwich is moved along the surface of hot plates. The scheme of this process is similar to the process shown in FIG. 3; the only difference is that instead of one hot plate (as it is shown in FIG. 3), two hot plates are used. The two hot plates have different temperatures with the first hot plate being preheated to a temperature of about 55° C. to about 75° C., the second plate having a temperature of about 102° C. The length of each hot plate is about 60 cm; the speed of the sandwiched movement is about 30 cm/min. The membrane is heated on each hot plate for about 2 minutes.

It is believed that the membrane treatment described above according to this scheme is approximately equal to the membrane treatment, as described in the example 6, and the same explanation of the process advantages applies.

During the heating of the first plate at about 50° C. to about 70° C., the hydrogen peroxide concentration in the solution is depleted. During the second cycle of heating (heating on the second plate at the high temperature), all the remaining of $H_2O_2$ is decomposed. Since the products of $H_2O_2$ $_{decomposition}$ are water and oxygen, the resultant membrane is not expected to contain any hazardous substances.

EXAMPLE 9

A sample of hydrophobic PES membrane (about 5 cm×50 cm) is prewetted and washed the same way as described in the Example 6 above. This sample is placed on the bar of the Mylar film with the width about 7 cm. and the length about 4 meters. The ends of the sample are attached with the staples to the supporting Mylar film.

Figure 7:
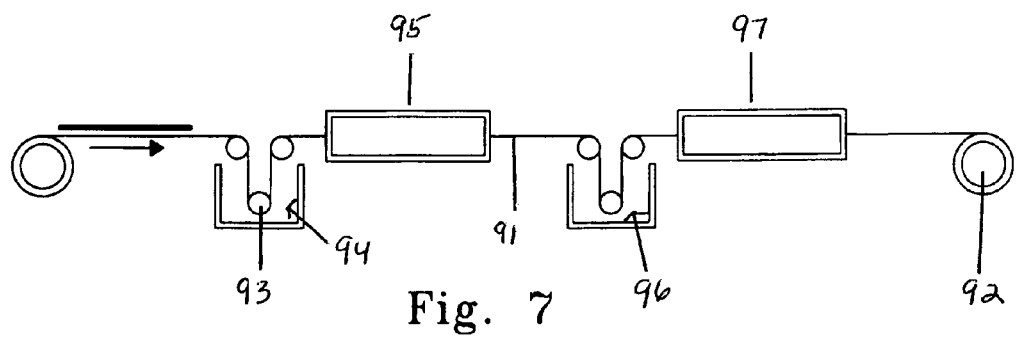
FIG. 7 is a schematic representation of a representative method of a representative two-cycle process of PES membrane oxidation.

The scheme of the laboratory system 90, which simulates a continuous hydrophilization process, is presented on the FIG. 7. The Mylar film 91 with attached membrane sample 92 is pulled by the roller 93 and is going through the bath 94, containing a solution of the first oxidizer, then along the steam chamber 95, then through a bath 96 with a solution of the second oxidizer, then along the steam chamber 97, and finally is wound on the roller 92.

The conditions of the oxidation process are as follows:

The solution of the first oxidizer: aqueous solution of bleach (HClO) with a concentration of about 12%; the solution of the second oxidizer: aqueous solution of APS with a concentration of about 6%. The speed of the Mylar film movement is about 20 cm/minute; the length of the steam chambers is about 50 cm.

After the membrane sample reaches the roller 92, it is detached from the Mylar film, washed in water at about 40° C. to about 50° C. and dried at about 65° C. for about 30 minutes.

It is presently believed that the first cycle of membrane oxidation utilizing the oxidizer with lower oxidation potential (bleach), works as a "pretreatment" for the final oxidation cycle with an application of the oxidizer with high oxidation potential (APS).

EXAMPLE 10

The membrane oxidation experiment is performed the same way as it described in the Example 9, but the solution in the bath 94 is about 3% APS, and the solution in the bath 96 is about 6% APS.

It is presently believed that the resultant membrane, obtained after two oxidation cycles, will have a higher oxidation degree and higher hydrophilicity, compared to the membrane obtained after a single oxidation cycle.

EXAMPLE 11

A sample of hydrophobic PES membrane (about 6 cm×about 6 cm) is prewetted into 50% aqueous solution of methanol and washed with DI water and immersed in aqueous solution, which contains about 95.8% water, about 4% APS, and about 0.2% of water soluble complex of Cu(II) (oxidation catalyst).

As is known according to available data in published literature, complexes of transition metals, including, but not limited to copper, zinc, iron etc. are water soluble substances, can be employed as catalysts for oxidation reactions and can significantly intensify the activity of oxidizers. Such complexes of transition metals are believed to lower the actuation energy barrier.

The membrane is heated in the above described solution at a temperature of about 70° C. for about 10 minutes, and then the membrane is removed from the solution, is washed with DI water for about 15 minutes at a temperature of about 40° C., and dried at about 70° C. for about 40 minutes.

It is believed that the membrane oxidation process, performed in the presence of the above described catalyst and any other catalyst having similar properties, will provide the membrane with enhanced hydrophilic properties, and reduced protein binding.

In view of the foregoing and in summary, there appear to be many possible potential process variations as specifically described above and include but are not limited to:

1. A method of PES membrane hydrophilization by oxidation wherein a dried membrane (the membrane has completed all the stages of the manufacturing process, including, but not limited to: casting, phase inversion, washing and drying) is oxidized.

2. A method of PES membrane hydrophilization by oxidation wherein, in order to make a hydrophilization process significantly simpler and shorter, a never dried gel membrane (the membrane after the stages of casting, phase inversion and washing, but prior to drying) is oxidized.

3. PES membrane hydrophilization by oxidation using rolls of the membrane in a batch process method of production.

4. PES membrane hydrophilization by oxidation using a continuous process wherein the membrane is sandwiched between Mylar films.

5. PES membrane hydrophilization by oxidation using a continuous process without the films application wherein uncovered membrane after soaking in the solution of the oxidizer is heated in a saturated steam environment in order to prevent membrane drying.

6. The method of PES membrane hydrophilization by oxidation described in 4 above wherein the uncovered membrane traverses the steam chamber without support, or the uncovered membrane can be supported with a transporting belt, or the uncovered membrane can be transported on the surface of the rotating drum or several successive drums.

7. The methods of PES membrane hydrophilization by oxidation described in 1-5 above wherein the temperature of the membrane treatment is changed during the oxidation process. This method is illustrated above by prophetic Example 6.

8. The methods of PES membrane hydrophilization by oxidation described in 1-6 wherein a mixture of two or more different oxidizers is utilized. The oxidizers can have different working temperatures and can be assorted such that the temperature elevation provides desirable sequential processes in the membrane oxidation process of the present disclosure. This method is illustrated by prophetic Example 7 above.

9 The methods of PES membrane hydrophilization by oxidation described in 6-7 wherein not one but several oxidization cycles are utilized. These oxidization cycles may be performed at different temperatures, different oxidizers, different concentrations of oxidizers. Prophetic example 8 above illustrates the utilization of two oxidation cycles performed at different temperatures; prophetic example 9 above illustrates the utilization of two oxidation cycles performed with different oxidizers; prophetic example 10 above illustrates the utilization of two oxidation cycles performed at different concentrations of oxidizer.

10. The methods of PES membrane hydrophilization as described in 1-9 above wherein the membrane oxidization is performed in the presence of the catalysts of the oxidation process, such as, for example, oxides or complexes of the transition metals, including, but not limited to, iron, copper, zinc, etc. The method is illustrated above by prophetic example 11.

While the articles, apparatus and methods for making the articles contained herein constitute presently preferred embodiments of the invention, it is to be understood that the disclosure is not limited to these precise articles, apparatus and methods, and that changes may be made therein without departing from the scope of the disclosure, which is defined in the appended claims.

What is claimed is:

1. A method of manufacturing hydrophilic polyethersulfone (PES) membrane comprising the acts of:
providing hydrophobic PES membrane;
prewetting the hydrophobic PES membrane in an amount of a liquid having a low surface tension;
exposing the wet hydrophobic PES membrane to an amount of an aqueous solution of oxidizer;
after the exposing act, heating the hydrophobic PES membrane at a predetermined temperature;
during the heating act, operatively positioning the PES membrane in a saturated water steam medium; and
continuously moving the PES membrane through the saturated water steam medium.

2. The method of claim 1 further comprising the act of:
after the prewetting act, washing the resultant membrane with water.

3. The method of claim 2 further comprising the act of:
after the heating act, drying the resultant membrane.

4. The method of claim 3 wherein, during the drying act, the resultant membrane is exposed to heat of about 70° C. to about 95° C.

5. The method of claim 3 wherein the washing act is partly performed before the membrane oxidation act.

6. The method of claim 2 wherein, during the heating act the hydrophobic PES membrane is heated at about 90° C. to about 95° C. for about 15 minutes.

7. The method of claim 1 wherein the oxidizer is selected from the group consisting of:
Ammonium persulfate (NH4)2S2O8, Hydrogen peroxide (H2O2), Bleach (HClO), Permanganate (MnO4−), Ozone (O3) or Dichromate (Cr2O8 −2) and combinations thereof.

8. The method of claim 1 wherein, during the heating act, the PES membrane is contained in a sufficient aqueous solution of sufficient oxidizer to cause oxidation of the membrane.

9. The method of claim 1 further comprising the act of:
after the heating act, washing the resultant membrane with water for a sufficient time in order to sufficiently remove the remains of the oxidizer therefrom.

10. The method of claim 1 wherein, the oxidizer comprises:
Ammonium persulfate $(NH_4)_2S_2O_8$.

11. The method of claim 1 further comprising the acts of:
after the exposing act in the solution of oxidizer, operatively positioning the membrane between two films so that the membrane is sandwiched therebetween; and
continuously moving the sandwiched membrane through at lest one heating zone.

12. A method of manufacturing hydrophilic polyethersulfone (PES) membrane comprising the acts of:
- providing gel PES membrane;
- exposing the gel PES membrane to an amount of an aqueous solution of oxidizer;
- after the exposing act, heating the hydrophobic PES membrane;
- during the heating act, operatively positioning the PES membrane in a saturated water steam medium; and
- continuously moving the PES membrane through the saturated water steam medium.

13. The method of claim 12 wherein the oxidizer is selected from the group consisting of: Ammonium persulfate $(NH_4)_2S_2O_8$, Hydrogen peroxide $(H_2O_2)$, Bleach (HClO), Permanganate $(MnO_4^-)$, Ozone $(O_3)$ or Dichromate $(Cr_2O_8^{-2})$ and combinations thereof.

14. The method of claim 12 further comprising the acts of:
- after the exposing act in the solution of oxidizer, operatively positioning the membrane between two films so that the membrane is sandwiched therebetween; and
- continuously moving the sandwiched membrane through at lest one heating zone.

* * * * *

UNITED STATES PATENT AND TRADEMARK OFFICE
CERTIFICATE OF CORRECTION

PATENT NO. : 7,537,718 B2
APPLICATION NO. : 11/250134
DATED : May 26, 2009
INVENTOR(S) : Mikhail S. Mezhirov It is certified that error appears in the above-identified patent and that said Letters Patent is hereby corrected as shown below:

Column 6
Line 30, after "section" insert -- . --.

Column 12
Line 50, after "solution" insert -- . --.

Column 14
Line 42, delete "Membrana" and insert -- Membrane --, therefor.

Column 18
Line 47, in Claim 7, delete "(NH4)2S2O8," and
  insert -- $(NH_4)_2S_2O_8$, --, therefor.
Line 48, in Claim 7, delete "(H2O2)," and insert -- $(H_2O_2)$, --, therefor.
Line 48, in Claim 7, delete "(MnO4-)," and insert -- $(MnO_4^-)$, --, therefor.
Line 49, in Claim 7, delete "(O3)," and insert -- $(O_3)$, --, therefor.
Line 49, in Claim 7, delete "(Cr2O8 -2)," and
  insert -- $(Cr_2O_8^{-2})$, --, therefor.
Line 67, in Claim 11, delete "lest" and insert -- least --, therefor.

Column 20
Line 11, in Claim 14, delete "lest" and insert -- least --, therefor.

Signed and Sealed this

Fourteenth Day of July, 2009

JOHN DOLL
*Acting Director of the United States Patent and Trademark Office*